June 4, 1929.   F. SCHULTZ   1,715,869
VEHICLE SIGNAL
Filed May 21, 1928   3 Sheets-Sheet 1
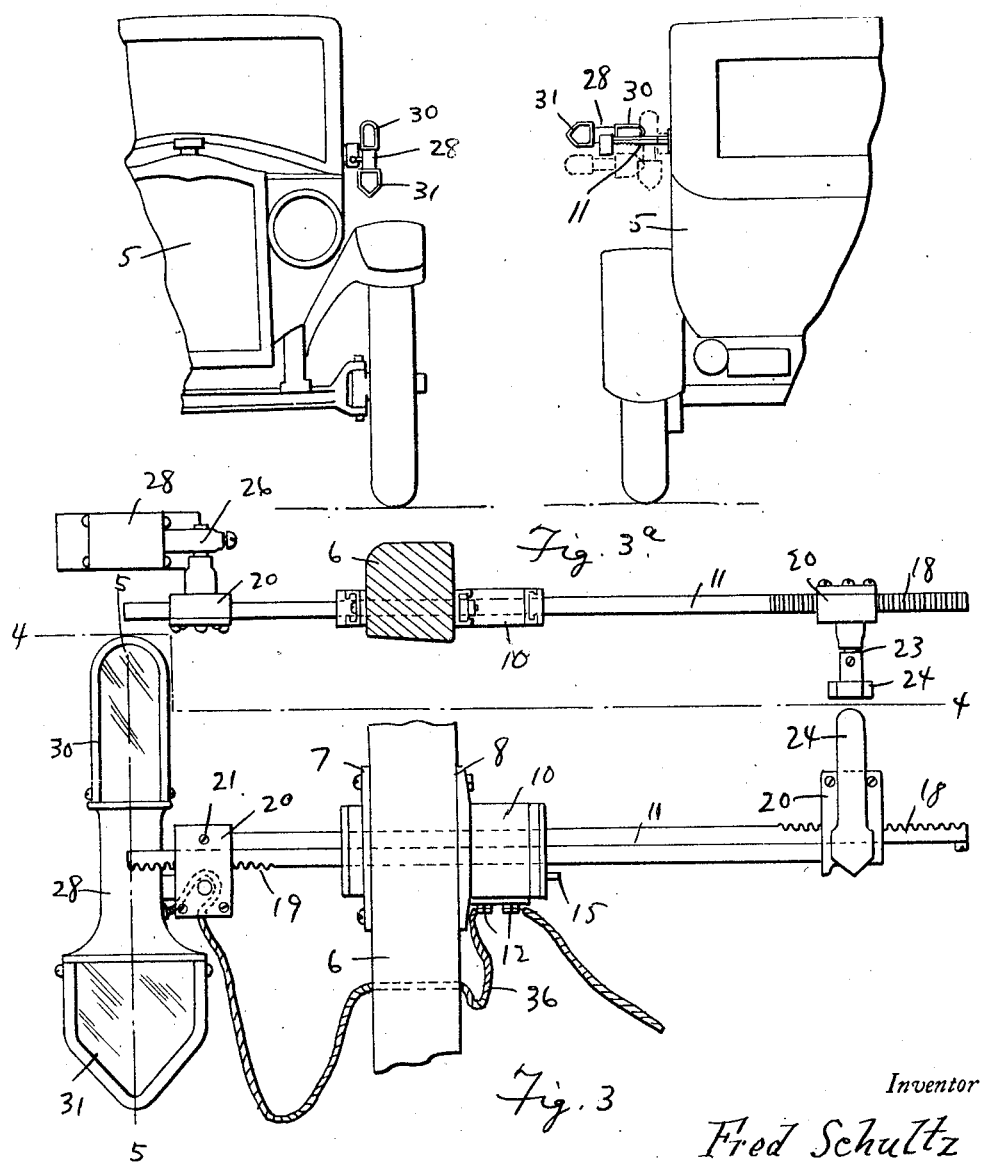
Inventor
Fred Schultz
By Clarence A. O'Brien
Attorney June 4, 1929.  F. SCHULTZ  1,715,869
VEHICLE SIGNAL
Filed May 21, 1928  3 Sheets-Sheet 2
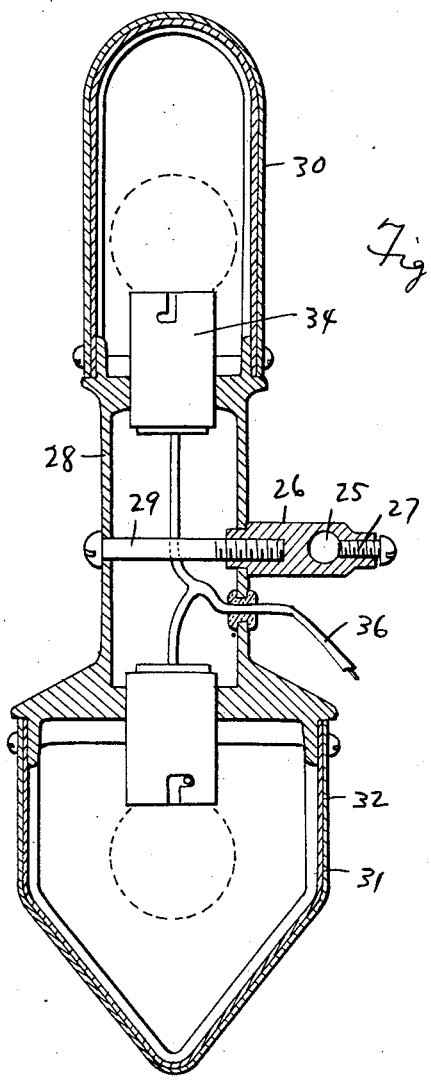
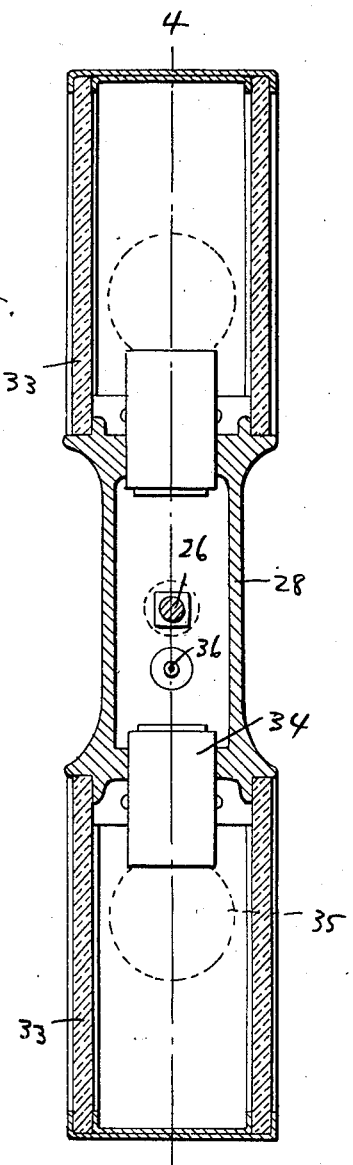
Inventor
Fred Schultz
By Clarence A. O'Brien
Attorney June 4, 1929.  F. SCHULTZ  1,715,869
VEHICLE SIGNAL
Filed May 21, 1928     3 Sheets-Sheet 3
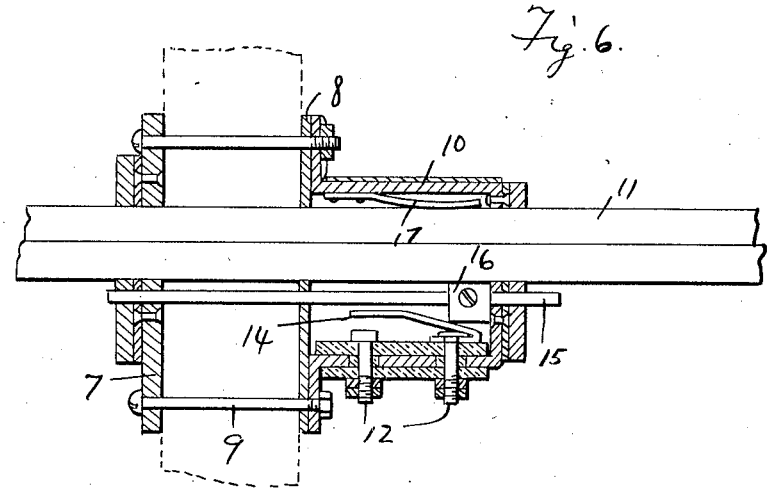
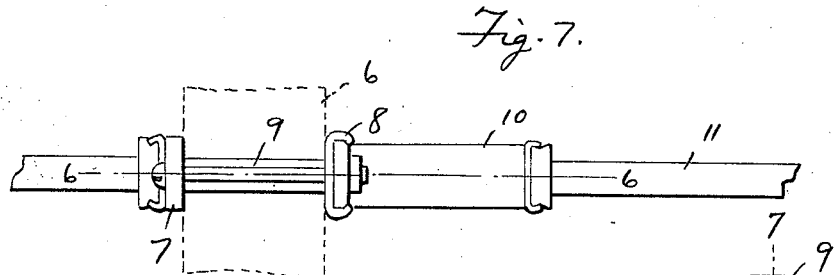
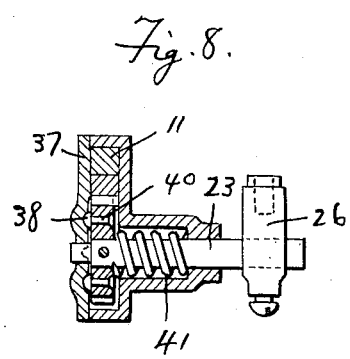
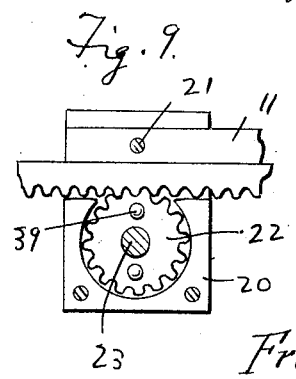
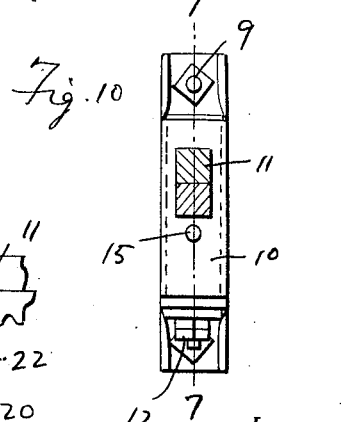
Inventor
Fred Schultz
By Clarence A. O'Brien
Attorney Patented June 4, 1929.

1,715,869

UNITED STATES PATENT OFFICE.

FRED SCHULTZ, OF DECATUR, ILLINOIS.

VEHICLE SIGNAL.

Application filed May 21, 1928. Serial No. 279,449.

The present invention relates to vehicle signalling devices and has for its principal object to provide a manually operable device of this character arranged at a convenient operating position for the driver of the vehicle, whereby to actuate a semaphore mounted at the outer end of a signalling arm, in order to indicate the direction in which the driver intends to turn.

A further object of the invention is to provide a circuit closer arranged for controlling a pair of lamps carried in the signal and arranging the closer for actuation upon the sliding movement of the signal arm into and out of signalling position.

A still further object of the invention is to provide a signalling device of this character, comprising generally a signalling arm mounted for sliding movement through one side of the vehicle, and having a semaphore mounted at the outer end thereof with an operating handle arranged at the inner end of the arm, said handle being adapted to selectively slidably actuate the arm or operate the semaphore into its various signalling positions.

An additional object is to provide a device of this character of a simple and practical construction, which is neat and attractive in appearance, efficient and reliable in performance, relatively inexpensive to manufacture in operative positions upon the vehicle and otherwise well adapted to the purpose for which the same is intended.

Other objects and advantages reside in the special construction and combination of the various elements comprising the invention, reference being had to the accompanying drawings, forming a part hereof, wherein:

Figure 1 is a fragmentary front elevational view of a vehicle showing my invention installed in position thereon and disposed out of operative position.

Figure 2 is a rear elevational view of the vehicle showing the signal in operative position, the dotted lines indicating the various positions in which the semaphore may be arranged.

Figure 3 is a side elevational view of the signalling device in assembled position mounted upon one of the posts of the automobile.

Figure 3ª is a top plan view thereof.

Figure 4 is a vertical sectional view through the semaphore taken substantially along the line 4—4 of Figure 5.

Figure 5 is a vertical sectional view through the semaphore arm taken along the line 5—5 of Figure 3.

Figure 6 is a fragmentary sectional view through a circuit closer constituting a part of the invention.

Figure 7 is a top plan view thereof.

Figure 8 is a horizontal sectional view through the mounting for the semaphore arm.

Figure 9 is a view in elevation, of such mounting with the cover plate removed, and Figure 10 is an end elevational view, with the biting arms shown in section, of one of the attaching plates for the circuit closer.

Referring now to the drawings in detail, wherein for the purpose of illustration is shown the preferred embodiment of my invention, the numeral 5 designates an automobile of conventional construction having an upwardly extending corner post 6, at the forward portion of the body thereof. The post 6 is provided with an opening extending transversely therethrough and to the outer side of the post about said opening is secured the plate member 7, with a similar plate 8, disposed at the inner side of the post about the opening therethrough and secured to the position to the outer plate 7 by bolts 9. The bolts 9 are also utilized to secure a switch box 10 to the inner plate 8, said switch box and the inner and outer plates having an opening formed therein in alignment with the opening of the post 6. A pair of rack bars 11, are inserted through said openings with their opposite ends disposed inwardly and outwardly of the post 6.

The rack bars 11 are disposed in superposed relation with respect to each other and are arranged for freely sliding movement through the post and the plate and switch box attached thereto. To the under side of this switch box is attached a pair of circuit wire terminals 12 extending through the wall of the box and terminating within the same in a pair of spaced contacts 13. To one of the contacts is attached the spring arm 14 having its free end normally disposed in spaced relation above the other of said contacts. A plunger 15 is slidably mounted in this switch box with one end protruding outwardly thereof at the inside of the post and its opposite end extending through the post and the plates 7 and 8 and protruding at the outer side thereof. The plunger 15 is disposed in spaced parallel relation with respect to the rack bars 11 and secured to the plunger within the switch box is a sliding block 15 adapted upon the sliding movement of the plunger to engage the spring arm 14 for moving the same into contacting position with the spaced contact 13. The spring 17 is mounted within the switch box 10 in spring pressed engagement with the uppermost of the rack bars 11, whereby to yieldably retain the bars in superposed relation and prevent play or rattling between the parts. On the upper edge at the inner end of the upper rack bar is arranged a rack 8, and to the lower edge of the outer end of the lower rack bar is arranged a similar rack 9.

Associated with each of the racks 18 and 19 is a duplicate gear housing 20, each of said housings being secured to the smooth end of the rack bar by a screw 21 and having a spur gear 22 arranged within the housing in engagement with the rack at the adjacent end of the pair of rack bars. The gear 22 is keyed to a shaft 23 extending outwardly to one side of the housing and the shaft of the housing disposed inwardly of the post 6 has its outer end provided with an operating handle 24. The shaft 23 of the outwardly disposed housing is inserted through an opening 25, extending transversely through an attaching pin 26 and secured in position therein by means of a set screw 27. One end of the pin 26 is seated in an opening formed intermediate the ends of a semaphore arm 28, said inserted end of the pin having a threaded bore formed therein for receiving a screw 29 carried by the semaphore arm, whereby to secure the pin in attached position thereto. The semaphore arm is thus pivotally supported intermediate its ends upon the shaft 23, whereby to permit the free swinging movement of the arm on an axis disposed at right angles to the rack bars 11, and longitudinally with respect to the vehicle. At each end of the semaphore arm is attached a lamp housing shown at 30 and 31 respectively, the housing 31 preferably being shaped in the form of an arrow head as clearly illustrated in Figures 1 and 2 of the drawings. Each of the housings 30 and 31 comprises a frame 32 having its sides disposed forwardly and rearwardly with respect to the vehicle open and fitted with a transparent cover 33. Within each of the housings of the semaphore arm is arranged a lamp socket 34, having an electric lamp 35 mounted therein, each of the lamps being connected in circuit through a wire 36 with the terminal 12 of the switch box.

It will be apparent from the foregoing, that the semaphore arm, when not in signalling position may be moved inwardly adjacent the outer side of the post 6 by sliding the pair of rack bars 11 inwardly through the post. When the driver desires to operate the signal, indicating an intention of turning in a predetermined direction, the rack bars 11 are moved outwardly through the post 6, so that the semaphore arm will be secured from the side of the car as far as possible, whereupon by turning the handle 24, in a desired direction, the pair of rack bars will be moved relative to each other, thereby causing a rotation of the shaft 23 through its associated gear engaged with the rack 19 and thus cause the actuation of the semaphore arm in a predetermined manner, depending upon the particular direction in which the driver intends to turn. Also, as the rack bars are moved outwardly through the post 6, the protruding end of the plunger 15 will be engaged by the gear housing 20 at the inner end of the rack bar and thus operate to close the circuit through the spring arm 14 of the contacts 13.

The lamps 35 of the semaphore arm will thus be energized upon the outward movement of the rack bars 11. Likewise, upon the return of the rack bars inwardly of the post, the end of the plunger protruding from the outer side thereof will then be engaged by the outer gear housing 20, so as to cause the disengagement between the spring arm 14 and the contact and open the circuit leading to the lamp. In order to secure the semaphore arm, in signalling position against accidental movement while the driver is making the turn, the cover plates of each of the gear housings 20 has its inner face provided with a series of shallow recesses 38 adapted to receive the heads 39 of a pair of pins 40, extending from the adjacent face of the gear 42, so that upon the seating of said head within one of the recesses of the plate, the parts will be secured against accidental displacement. The side of the gear 22 opposite from the heads 39 is engaged by a coil spring 41, mounted on the shaft 23 within the gear housing, so as to be yieldably retaining the heads of the pin within the recesses of the cover plate.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

1. A vehicle signal comprising a pair of superposed relatively movable rack bars mounted for sliding movement on the vehicle, a duplicate gear housing mounted on each rack bar and secured to the opposite ends of said bars, a gear mounted in each housing engageable with the opposite rack bar, an operating handle for one of said gears adapted through its actuation to selectively slidably actuate said rack bars, either as a unit or independent of each other, and a semaphore arm attached to the other of said gears responsive for movement of the actuating means.

2. A vehicle signal comprising a pair of rack bars disposed in superposed relation and mounted for relatively sliding movement on the vehicle, one end of each of said bars having a rack formed on its opposed edge, a duplicate gear housing secured to the opposite end of each of said bars, a gear mounted on each of the housings engaging the rack of the opposite bar, an operating handle for one of the gears, operable to selectively move said bars as a unit, in either direction, for relatively moving the same in opposite directions, and a semaphore arm pivotally mounted on said other gear, and responsive for movement in accordance with the movement of the handle.

3. A vehicle signal comprising a pair of rack bars disposed in superposed relation and mounted for relatively sliding movement on the vehicle, one edge of each of said bars having a rack formed on its opposed edge, a duplicate gear housing secured to the opposite end of each of said bars, a gear mounted on each of the housings engaging the rack of the opposite bar, an operating handle for one of the gears, operable to selectively move said bars as a unit, in either direction, for relatively moving the same in opposite directions, a semaphore arm pivotally mounted on said other gear and responsive for movement in accordance with the movement of said handle, and interengaging means between the gear and the housing adapted to yieldably secure the gear in a predetermined position.

In testimony whereof I affix my signature.

FRED SCHULTZ.